(12) United States Patent
Wakabayashi et al.

(10) Patent No.: US 12,079,303 B2
(45) Date of Patent: Sep. 3, 2024

(54) DEGRADATION DETECTION SYSTEM

(71) Applicant: Mitsubishi Electric Corporation, Tokyo (JP)

(72) Inventors: Yuichi Wakabayashi, Tokyo (JP); Koji Wakimoto, Tokyo (JP); Izumi Otsuka, Tokyo (JP); Chikato Ishitobi, Tokyo (JP); Takehisa Haraguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 335 days.

(21) Appl. No.: 17/214,274

(22) Filed: Mar. 26, 2021

(65) Prior Publication Data

US 2021/0216609 A1    Jul. 15, 2021

Related U.S. Application Data

(63) Continuation of application No. PCT/JP2019/034731, filed on Sep. 4, 2019.

(30) Foreign Application Priority Data

Oct. 1, 2018 (JP) .................................. 2018-186643

(51) Int. Cl.
*G06F 17/15* (2006.01)
*G06F 17/18* (2006.01)
(Continued)

(52) U.S. Cl.
CPC .............. *G06F 17/18* (2013.01); *G06F 17/15* (2013.01); *G06F 18/2132* (2023.01); *G08B 21/18* (2013.01)

(58) Field of Classification Search
CPC ......... G08B 21/18; G06F 17/18; G06F 17/15; G06F 18/2132; G05B 23/0254
(Continued)

(56) References Cited

U.S. PATENT DOCUMENTS 8,339,637 B2 * 12/2012 Nakazato .............. G06F 3/1218
358/1.14
8,494,826 B2 * 7/2013 Richards ................ G05B 17/02
703/7
(Continued)

FOREIGN PATENT DOCUMENTS

JP      7-168619 A      7/1995
JP      9-145405 A      6/1997
(Continued)

OTHER PUBLICATIONS

Indian Ofice Action for Indian Application No. 202147014353, dated Feb. 4, 2022, with English translation.
(Continued)

*Primary Examiner* — Jeffrey P Aiello
(74) *Attorney, Agent, or Firm* — BIRCH, STEWART, KOLASCH & BIRCH, LLP

(57) ABSTRACT

There are included a normal model building unit that builds a normal model of another device on the basis of normal data of the other device; a degradation determination model building unit that builds a degradation determination model of the other device on the basis of the normal data and degradation data of the other device; a normal model rebuilding unit that builds a normal model of a target device on the basis of the normal model of the other device and normal data of the target device; a degradation determination model rebuilding unit that builds a degradation determination model of the target device on the basis of the degradation determination model of the other device and the normal model of the target device; and a degradation determining unit that determines degradation of the target device on the basis of operation data of the target device and the degradation determination model of the target device.

17 Claims, 11 Drawing Sheets

(51) Int. Cl.
*G06F 18/2132* (2023.01)
*G08B 21/18* (2006.01)

(58) Field of Classification Search
USPC .... 700/108, 30, 28, 109; 702/184, 183, 188, 702/182, 185, 189, 34, 104, 35, 1, 33, 702/181, 127, 84, 81; 703/2, 7, 13, 20, 703/21, 6, 1
See application file for complete search history.

(56) References Cited

U.S. PATENT DOCUMENTS

| | | | | |
|---|---|---|---|---|
| 8,712,929 | B1* | 4/2014 | Bickford | G06Q 50/06 |
| | | | | 700/286 |
| 8,831,922 | B2* | 9/2014 | Sakakibara | B60R 16/0232 |
| | | | | 701/31.7 |
| 2012/0136629 | A1 | 5/2012 | Tamaki et al. | |
| 2012/0310597 | A1* | 12/2012 | Uchiyama | G05B 23/0278 |
| | | | | 702/185 |
| 2014/0365179 | A1* | 12/2014 | Horowitz | G05B 23/0254 |
| | | | | 702/185 |
| 2016/0061970 | A1* | 3/2016 | Asai | G01T 1/175 |
| | | | | 702/182 |

FOREIGN PATENT DOCUMENTS

| | | |
|---|---|---|
| JP | 2006-343063 A | 12/2006 |
| JP | 5297272 B2 | 6/2013 |
| JP | 2016-91378 A | 5/2016 |
| JP | 2016-157206 A | 9/2016 |
| JP | 2018-147080 A | 9/2018 |

OTHER PUBLICATIONS

Office Action issued Apr. 29, 2022 in corresponding Korean Patent Application No. 2021-7008240 with English Translation.

* cited by examiner

DEGRADATION DETECTION SYSTEM

CROSS REFERENCE TO RELATED APPLICATIONS

This application is a Continuation of PCT International Application No. PCT/JP2019/034731, filed on Sep. 4, 2019, which claims priority under 35 U.S.C. 119(a) to Patent Application No. 2018-186643, filed in Japan on Oct. 1, 2018, all of which are hereby expressly incorporated by reference into the present application.

TECHNICAL FIELD

The invention relates to a degradation detection system that detects aging degradation of a device.

BACKGROUND ART

There is a need for various devices such as railway-related devices, power generating plant apparatuses, or factory line facilities to achieve preventive maintenance for the devices, and techniques for detecting degradation of the devices (degradation detection techniques) have been researched.

In general, to perform high-accuracy detection of degradation of a device, there is a need to collect operation data in both a normal state and a degradation state for each device serving as a target (hereinafter, referred to as a target device). However, in actual devices, there are many devices whose degradation proceeds slowly, and in many cases a time when abnormality starts to occur cannot be accurately identified, and thus, it is difficult to collect a sufficient amount of operation data in a degradation state.

Hence, there is a method in which devices are grouped by model, etc., on the basis of specifications of the devices, and a diagnostic model is built for each group using operation data of all devices in the same group (see, for example, Patent Literature 1). Then, upon detection of degradation of a target device, first, a group to which the target device belongs is identified from specifications, and degradation is detected using a diagnostic model for the group. As a result, degradation detection can be performed even when the amounts of pieces of operation data of individual devices are small.

CITATION LIST

Patent Literature

Patent Literature 1: JP 2016-091378 A

SUMMARY OF INVENTION

Technical Problem

As described above, in a conventional technique, a diagnostic model is built using data of all devices belonging to the same group as a target device. Thus, in the conventional technique, to obtain a diagnostic model that accurately represents the target device, operation data of each device in the group and operation data of the target device need to be similar operation data. If operation data of each device in the same group as the target device includes data that behaves differently than operation data of the target device, then a built diagnostic model does not accurately represent behavior of the target device and thus accurate detection of degradation cannot be performed.

In addition, in general, even if models are identical, for devices with great individual differences, great differences in installation conditions, great differences in environmental conditions, or the like, degradation cannot be detected accurately even if a diagnostic model built using operation data of the identical models is applied to the individual devices.

Furthermore, if conditions are finely divided taking individual differences, installation conditions, environmental conditions, or the like into account, and a diagnostic model is built for each condition, then massive amount and types of operation data are required to build each diagnostic model.

The invention is made to solve the above-described problem, and an object of the invention is to provide a degradation detection system that can detect degradation of a target device without using operation data in a degradation state of the target device.

Solution to Problem

A degradation detection system according to the invention includes: processing circuitry to build a normal model of the target device, which is a model of the target device in a normal state, on a basis of the normal model of another device which is different from the target device in a normal state, the normal model of the other device being built on a basis of normal data on the other device, which is operation data of the other device in a normal state, and normal data of the target device, which is operation data of the target device in a normal state; to build a degradation determination model of the target device on a basis of the degradation determination model of the other device, which is a model for determining degradation of the other device from operation data of the other device, on a basis of the normal data of the other device and degradation data of the other device, and the normal model of the target device, the degradation determination model of the target device being a model for determining degradation of the target device from operation data of the target device; and to determine degradation of the target device on a basis of operation data of the target device and the degradation determination model of the target device.

Advantageous Effects of Invention

According to the invention, since due to the above-described configuration, degradation of a target device can be detected without using operation data of the target device in a degradation state.

DESCRIPTION OF EMBODIMENTS

Embodiments of the invention will be described in detail below with reference to the accompanying drawings.

First Embodiment

Figure 1:
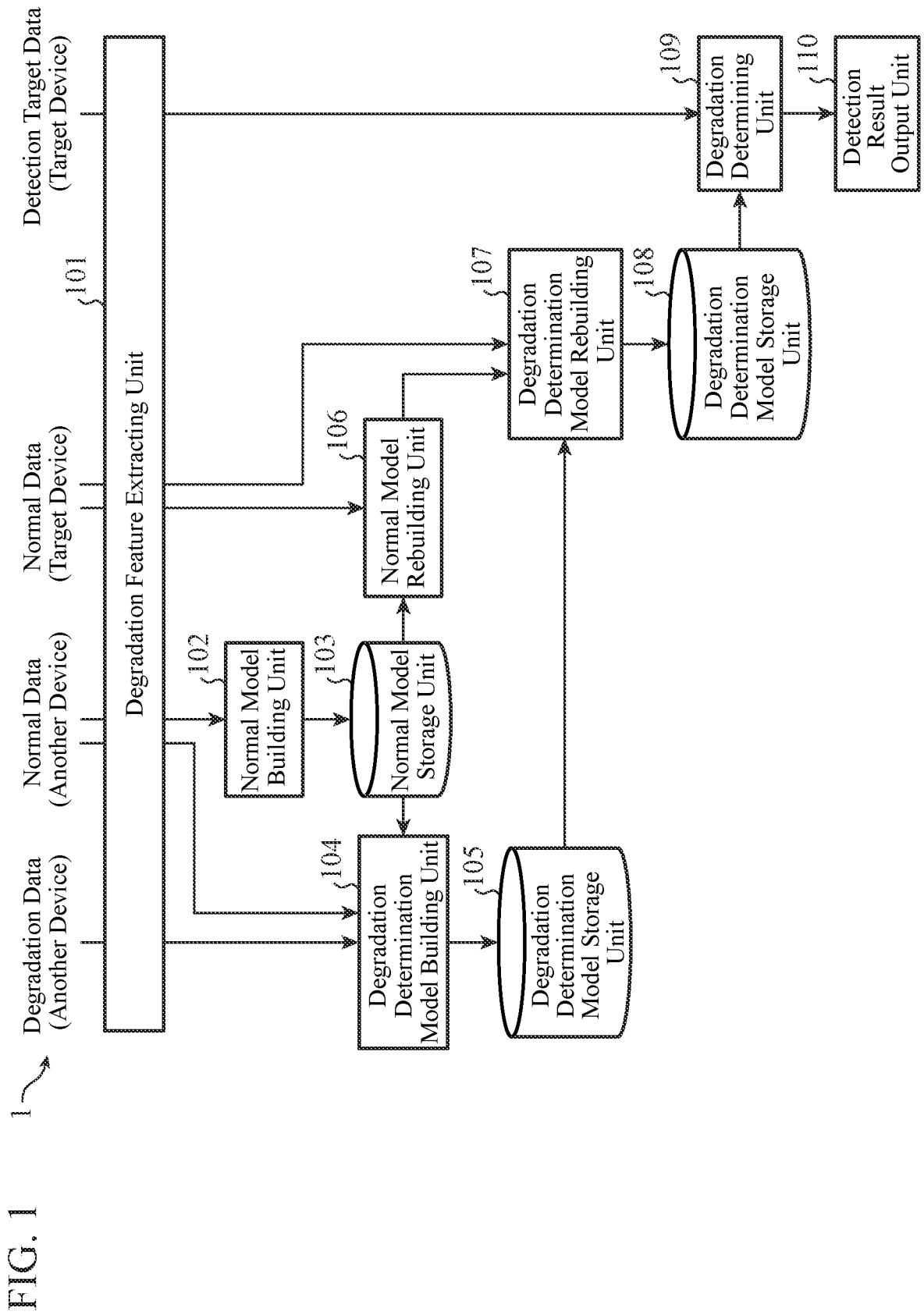
FIG. 1 is a diagram showing an exemplary configuration of a degradation detection system according to a first embodiment of the invention.

FIG. 1 is a diagram showing an exemplary configuration of a degradation detection system 1 according to a first embodiment of the invention.

The degradation detection system 1 detects degradation of a device serving as a target (hereinafter, referred to as target device). Note that the target device is, for example, a railway-related device such as a platform screen door, a device mounted on a train such as a brake, a power generating plant apparatus, or a factory line facility. As shown in FIG. 1, the degradation detection system 1 includes a degradation feature extracting unit 101, a normal model building unit 102, a normal model storage unit 103, a degradation determination model building unit 104, a degradation determination model storage unit 105, a normal model rebuilding unit 106, a degradation determination model rebuilding unit 107, a degradation determination model storage unit 108, a degradation determining unit 109, and a detection result output unit 110.

The degradation feature extracting unit 101 extracts feature values from inputted operation data. Operation data to be inputted to the degradation feature extracting unit 101 is any one of operation data in a normal state (normal data) and operation data in a degradation state (degradation data) that are collected from another device (hereinafter, referred to as the other device) different from a target device, operation data in a normal state (normal data) collected from the target device, and operation data (detection target data) collected from the target device. Note that the normal data and detection target data of the target device are sequentially collected. In addition, feature value to be extracted by the degradation feature extracting unit 101 is a feature value having possibility to reflect degradation.

The degradation feature extracting unit 101 first extracts feature values from normal data and degradation data collected from the other device. Then, the degradation feature extracting unit 101 extracts feature values from pieces of normal data that are sequentially collected from the target device immediately after the start of operation of the target device. Then, the degradation feature extracting unit 101 extracts feature values from pieces of detection target data that are sequentially collected from the target device.

Note that a method of extracting a feature value having possibility to reflect degradation is determined depending on design, physical knowledge, prior analysis, or the like. A feature value extracted from normal data by the degradation feature extracting unit 101 is hereinafter referred to as normal feature value data. A feature value extracted from degradation data by the degradation feature extracting unit 101 is referred to as degradation feature value data. A feature value extracted from detection target data by the degradation feature extracting unit 101 is referred to as detection target feature value data. Note that the other device may be, for example, a testing apparatus or a device for which data is collected beforehand in a different environment.

Note that FIG. 1 shows a case in which the degradation detection system 1 includes the degradation feature extracting unit 101. However, no limitation is intended thereto, and the degradation detection system 1 may not include the degradation feature extracting unit 101.

The normal model building unit 102 builds a model of the other device in a normal state (normal model) on the basis of normal feature value data of the other device extracted by the degradation feature extracting unit 101. As the normal model, for example, behavior that may be shown in normal feature value data, a pattern that may be shown in normal feature value data, a range of the behavior or a range of the pattern, and a correlation between feature values extracted from one or more pieces of normal feature value data which are represented by equations, graphs, or networks can be used. When a normal model is built using a graph structure representing a correlation between feature values, the graph structure can be represented by, for example, a covariance matrix of feature vectors or a precision matrix which is the inverse of the covariance matrix.

The normal model storage unit 103 stores data representing the normal model of the other device built by the normal model building unit 102.

The degradation determination model building unit 104 builds a model for determining degradation (degradation determination model) of the other device from operation data of the other device, on the basis of the normal feature value data and degradation feature value data of the other device extracted by the degradation feature extracting unit 101. Upon the model building, the degradation determination model building unit 104 may build a degradation determination model of the other device on the basis of the normal model of the other device read from the normal model storage unit 103 in addition to the above-described normal feature value data and degradation feature value data of the other device. Details of the degradation determination model building unit 104 will be described later.

The degradation determination model storage unit 105 stores data representing the degradation determination model of the other device built by the degradation determination model building unit 104.

The degradation detection system 1 builds a normal model of the other device and a degradation determination model of the other device before building a model of the target device and determining degradation of the target device.

The normal model rebuilding unit 106 builds a model of the target device in a normal state (normal model) on the basis of the normal model of the other device read from the normal model storage unit 103 and normal feature value data of the target device extracted by the degradation feature extracting unit 101. Details of the normal model rebuilding unit 106 will be described later.

The degradation determination model rebuilding unit 107 builds a model for determining degradation (degradation determination model) from operation data of the target device, on the basis of the degradation determination model of the other device read from the degradation determination model storage unit 105 and the normal model of the target device built by the normal model rebuilding unit 106. Upon the model building, the degradation determination model rebuilding unit 107 may build a degradation determination model of the target device on the basis of normal feature value data of the target device extracted by the degradation feature extracting unit 101 in addition to the above-described degradation determination model of the other device and normal model of the target device. Details of the degradation determination model rebuilding unit 107 will be described later.

The degradation determination model storage unit 108 stores data representing the degradation determination model of the target device built by the degradation determination model rebuilding unit 107.

The degradation determining unit 109 determines degradation of the target device on the basis of detection target feature value data extracted by the degradation feature extracting unit 101 and the degradation determination model of the target device read from the degradation determination model storage unit 108. Upon the determination, the degradation determining unit 109 determines whether the target device is normal or degraded by applying the degradation determination model of the target device to the detection target feature value data.

The detection result output unit 110 outputs data representing a result of the determination performed by the degradation determining unit 109 to the outside.

Next, an exemplary configuration of the degradation determination model building unit 104 will be described with reference to FIG. 2.

Figure 2:
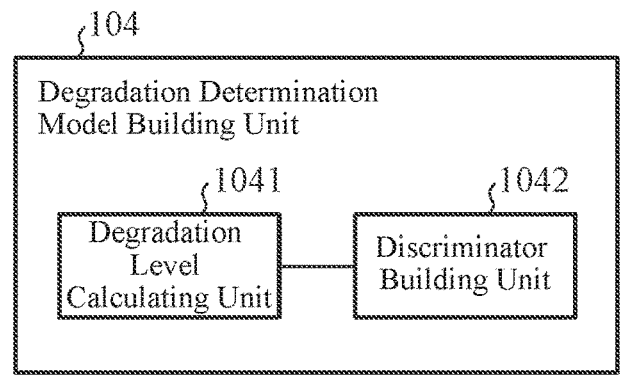
FIG. 2 is a diagram showing an exemplary configuration of a degradation determination model building unit in the first embodiment of the invention.

As shown in FIG. 2, the degradation determination model building unit 104 includes a degradation level calculating unit 1041 and a discriminator building unit 1042.

The degradation level calculating unit 1041 calculates a degradation level of normal feature value data and a degradation level of degradation feature value data of the other device by applying a normal model of the other device to each of the normal feature value data and the degradation feature value data.

The discriminator building unit 1042 builds a discriminator that can discriminate between the degradation level of the normal feature value data and the degradation level of the degradation feature value data calculated by the degradation level calculating unit 1041, and uses the discriminator as a degradation determination model.

Next, an exemplary configuration of the normal model rebuilding unit 106 will be described with reference to FIG. 3.

Figure 3:
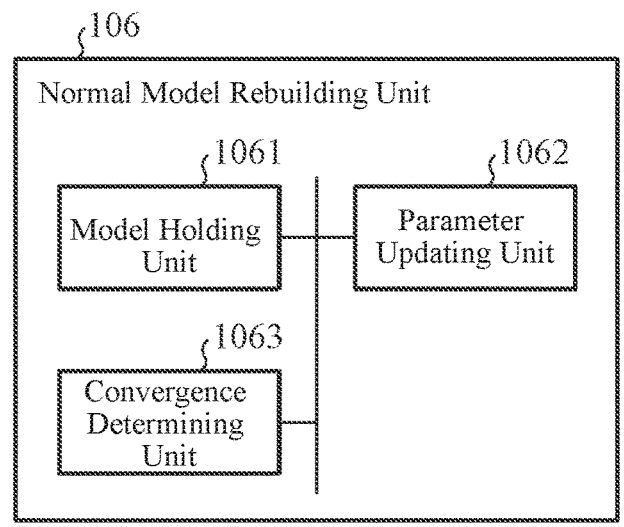
FIG. 3 is a diagram showing an exemplary configuration of a normal model rebuilding unit in the first embodiment of the invention.

As shown in FIG. 3, the normal model rebuilding unit 106 includes a model holding unit 1061, a parameter updating unit 1062, and a convergence determining unit 1063.

The model holding unit 1061 holds a normal model of the other device as a normal model of a target device.

The parameter updating unit 1062 updates a parameter of the normal model of the target device held in the model holding unit 1061, using normal feature value data of the target device. The parameter updating unit 1062 updates the parameter of the normal model of the target device every time normal data of the target device is collected, the data being collected sequentially, until the convergence determining unit 1063 determines that the parameter has converged.

Since there are devices individual differences or differences in installation conditions or environmental conditions between the other device and the target device, data of the other device and data of the target device generally have different trends. Hence, when a model built using data of the other data is applied as it is to the target device, it is difficult to accurately detect degradation occurring in the target device. Hence, the degradation detection system 1 updates a parameter of a model built for the other device, using normal data of the target device. As a result, the degradation detection system 1 can rebuild a model to be suitable for the target device.

In addition, in many cases, it is difficult to collect beforehand a sufficient amount of data for training for all target devices. Hence, the degradation detection system 1 updates a parameter of a model built beforehand for the other device, using data sequentially collected from the target device, thereby obtaining a model of the target device online. As a result, even when there is not sufficient data of the target device beforehand, the degradation detection system 1 can rebuild a model with high accuracy.

The convergence determining unit 1063 determines whether the parameter updated by the parameter updating unit 1062 has converged. The convergence determining unit 1063 determines whether the parameter of the normal model updated by the parameter updating unit 1062 has converged, every time normal data of the target device is collected, the data being collected sequentially. The convergence determining unit 1063 repeats this operation until determining that the parameter has converged.

Note that there is, for example, a method in which the update ends when a certain number of parameter updates has been made, but with this method there is a possibility that an update ends before the parameter converges, i.e., before a model is rebuilt. Hence, the convergence determining unit 1063 performs a parameter convergence determination, enabling the degradation detection system 1 to build an accurate model.

The parameter updating unit 1062 and the convergence determining unit 1063 start a parameter update and a parameter convergence determination when collection of data from the target device at normal operation is started.

The parameter updating unit 1062 ends the parameter update when it is determined that the parameter has converged or when the target device has operated for a certain period of time and data being collected is highly likely not to be normal data. Here, a determination as to whether or not collected data is highly likely not to be normal is made from device's design knowledge or physical knowledge, etc.

Next, an exemplary configuration of the degradation determination model rebuilding unit 107 will be described with reference to FIG. 4.

Figure 4:
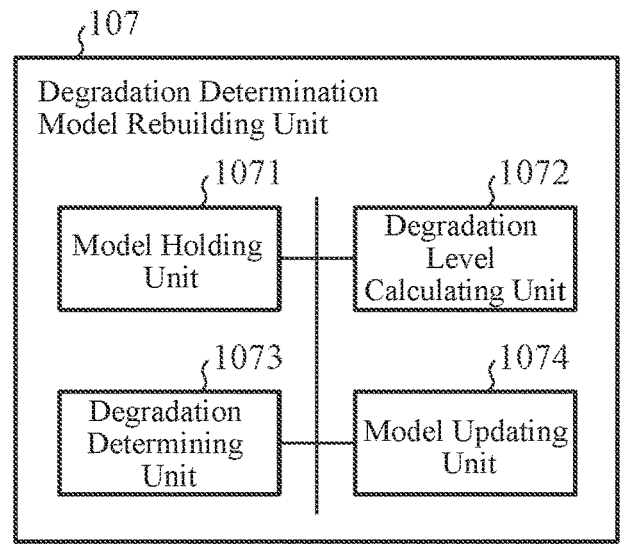
FIG. 4 is a diagram showing an exemplary configuration of a degradation determination model rebuilding unit in the first embodiment of the invention.

As shown in FIG. 4, the degradation determination model rebuilding unit 107 includes a model holding unit 1071, a degradation level calculating unit 1072, a degradation determining unit (second degradation determining unit) 1073, and a model updating unit 1074.

The model holding unit 1071 holds a degradation determination model of the other device as a degradation determination model of the target device.

The degradation level calculating unit 1072 calculates a degradation level of normal feature value data of the target device by applying a normal model of the target device to the normal feature value data. The degradation level calculating unit 1072 calculates the degradation level until the normal model rebuilding unit 106 completes model building. The degradation level calculating unit 1072 calculates a degradation level of normal feature value data using a parameter of a normal model updated by the parameter updating unit 1062, every time normal data of the target device, the data being collected sequentially, is collected.

The degradation determining unit 1073 performs a degradation determination by applying the degradation determination model of the target device held in the model holding unit 1071 to the degradation level calculated by the degradation level calculating unit 1072.

The model updating unit 1074 updates the degradation determination model of the target device held in the model holding unit 1071, on the basis of a result of the determination performed by the degradation determining unit 1073.

Next, exemplary operation of the degradation detection system 1 according to the first embodiment will be described with reference to FIG. 5.

In the conventional technique, since only model information of a target device is used, accurate detection of degradation cannot be performed due to factors such as individual differences unique to devices. On the other hand, although it is difficult to collect degradation data of a target device by using an actual device, it may be possible to sequentially collect normal data of the target device. Hence, the degradation detection system 1 according to the first embodiment modifies the normal model and the degradation determination model of the other device using normal data of a target device, thereby building a normal model and a degradation determination model that can more accurately represent the target device. As a result, the degradation detection system 1 according to the first embodiment improves accuracy of degradation detection.

Figure 5:
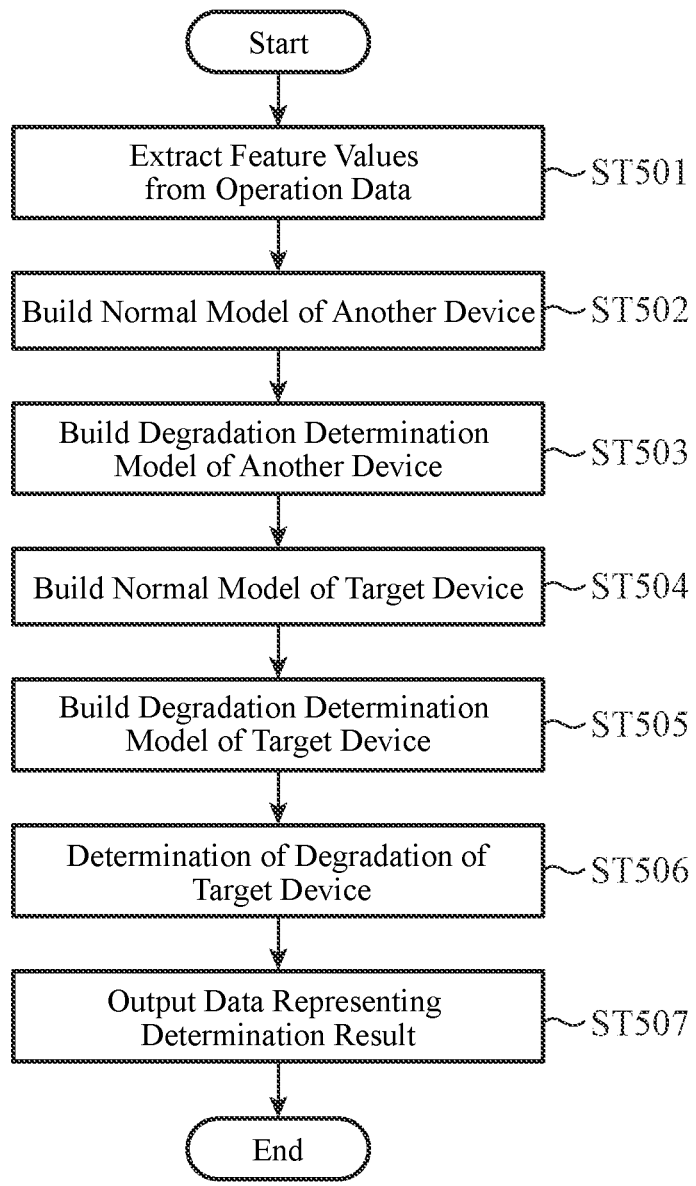
FIG. 5 is a flowchart showing exemplary operation of the degradation detection system according to the first embodiment of the invention.

In the exemplary operation of the degradation detection system 1 according to the first embodiment, as shown in FIG. 5, first, the degradation feature extracting unit 101 extracts feature values from inputted operation data (step ST501).

Then, the normal model building unit 102 builds a normal model of the other device on the basis of normal feature value data of the other device extracted by the degradation feature extracting unit 101 (step ST502). Data representing the normal model of the other device built by the normal model building unit 102 is stored in the normal model storage unit 103. Detailed exemplary operation of the normal model building unit 102 will be described later.

Then, the degradation determination model building unit 104 builds a degradation determination model of the other device on the basis of normal feature value data and degradation feature value data of the other device extracted by the degradation feature extracting unit 101 and the normal model of the other device read from the normal model storage unit 103 (step ST503). Data representing the degradation determination model of the other device built by the degradation determination model building unit 104 is stored in the degradation determination model storage unit 105. Detailed exemplary operation of the degradation determination model building unit 104 will be described later.

Then, the normal model rebuilding unit 106 builds a normal model of a target device on the basis of the normal model of the other device read from the normal model storage unit 103 and normal feature value data of the target device extracted by the degradation feature extracting unit 101 (step ST504). Detailed exemplary operation of the normal model rebuilding unit 106 will be described later.

Then, the degradation determination model rebuilding unit 107 builds a degradation determination model of the target device on the basis of the degradation determination model of the other device read from the degradation determination model storage unit 105, the normal model of the target device built by the normal model rebuilding unit 106, and normal feature value data of the target device extracted by the degradation feature extracting unit 101 (step ST505). Data representing the degradation determination model of the target device built by the degradation determination model rebuilding unit 107 is stored in the degradation determination model storage unit 108. Detailed exemplary operation of the degradation determination model rebuilding unit 107 will be described later.

Then, the degradation determining unit 109 determines degradation of the target device on the basis of detection target feature value data extracted by the degradation feature extracting unit 101 and the degradation determination model of the target device read from the degradation determination model storage unit 108 (step ST506).

Then, the detection result output unit 110 outputs data representing a result of the determination performed by the degradation determining unit 109 to the outside (step ST507).

Next, exemplary operation of the normal model building unit 102 will be described with reference to FIG. 6.

Figure 6:
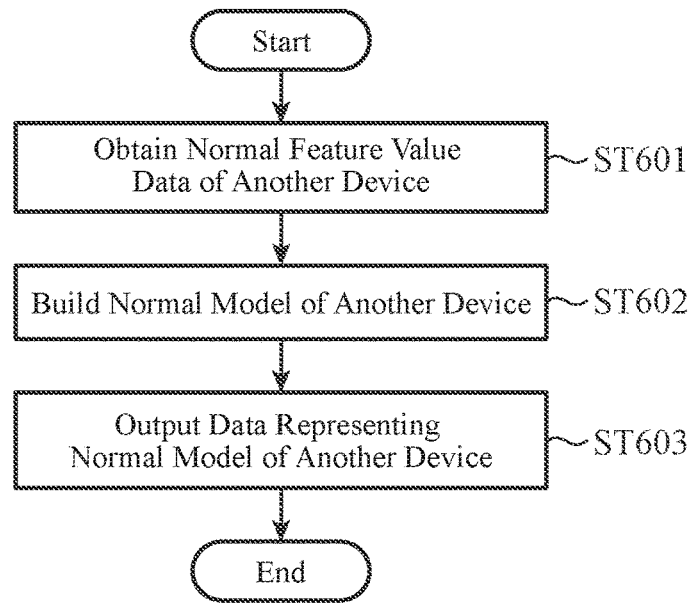
FIG. 6 is a flowchart showing exemplary operation of a normal model building unit in the first embodiment of the invention.

In the exemplary operation of the normal model building unit 102, as shown in FIG. 6, first, the normal model building unit 102 obtains normal feature value data of the other device extracted by the degradation feature extracting unit 101 (step ST601).

Then, the normal model building unit 102 builds a normal model of the other device on the basis of the normal feature value data of the other device (step ST602).

Then, the normal model building unit 102 outputs data representing the normal model of the other device (step ST603).

Next, exemplary operation of the degradation determination model building unit 104 will be described with reference to FIG. 7.

Figure 7:
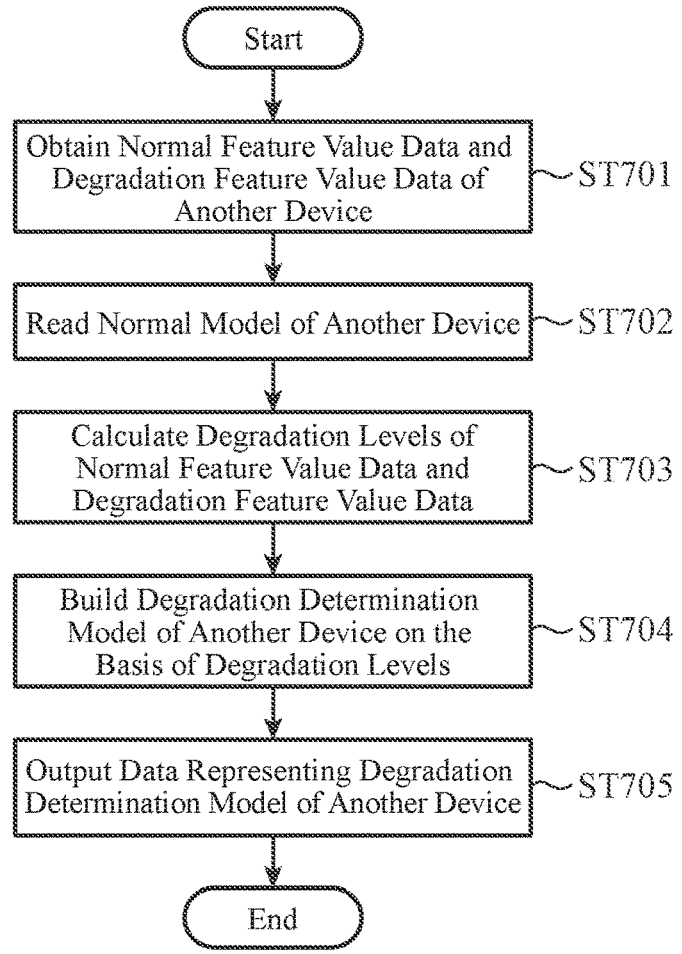
FIG. 7 is a flowchart showing exemplary operation of the degradation determination model building unit in the first embodiment of the invention.

In the exemplary operation of the degradation determination model building unit 104, as shown in FIG. 7, first, the degradation determination model building unit 104 obtains normal feature value data and degradation feature value data of the other device extracted by the degradation feature extracting unit 101 (step ST701).

The degradation determination model building unit 104 reads a normal model of the other device stored in the normal model storage unit 103 (step ST702).

Then, the degradation level calculating unit 1041 calculates a degradation level of the normal feature value data and a degradation level of the degradation feature value data of the other device by applying the normal model of the other device to each of the normal feature value data and the degradation feature value data (step ST703).

As the method of calculating a degradation level, for example, in a case where the normal model is a graph structure representing a correlation between feature values, the calculation method using the following equation (1) can be considered. In equation (1), $x(k) \in R'$ represents a k-th r-dimensional feature vector in all feature value data, a(k) represents the level of abnormality (degradation level) of x(k), and P(x) represents a probability distribution of x, k represents a time when data is obtained, and the value of k is sequentially updated every time data is obtained.

$$a(k)=-\log(P(x(k))) \quad (1)$$

When a normal distribution of $P(x(k))=N(x(k)|\mu, \Sigma)$ is assumed, the degradation level is represented by the Mahalanobis distance of the following equation (2). Here, µ represents the mean of x and Σ represents the covariance matrix of x.

$$a(k)=(x(k)-\mu)^t \Sigma^{-1}(x(k)-\mu) \quad (2)$$

The above-described method of calculating a degradation level is only an example and other methods may be used, and the degradation level may be a multidimensional vector.

Then, the discriminator building unit 1042 builds a discriminator that can discriminate between the degradation level of the normal feature value data and degradation level of the degradation feature value data calculated by the degradation level calculating unit 1041, and uses the discriminator as a degradation determination model (step ST704).

For a method of building a discriminator, for example, when the degradation level is calculated by equation (2), a discriminator can be obtained by calculating a threshold value that most successfully discriminates between the degradation level of normal feature value data and the degradation level of degradation feature value data, by applying a receiver operating characteristic (ROC) curve to the degradation levels.

Then, the degradation determination model building unit 104 outputs data representing the degradation determination model of the other device (step ST705).

Next, exemplary operation of the normal model rebuilding unit 106 will be described with reference to FIG. 8.

Figure 8:
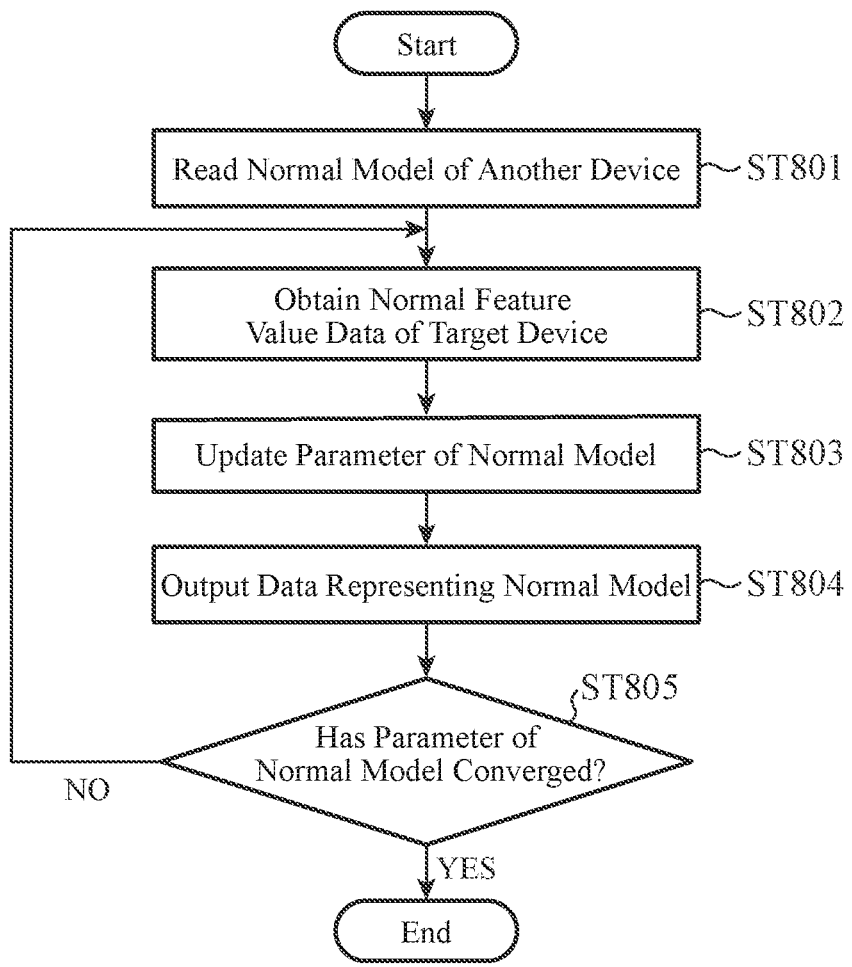
FIG. 8 is a flowchart showing exemplary operation of the normal model rebuilding unit in the first embodiment of the invention.

In the exemplary operation of the normal model rebuilding unit 106, as shown in FIG. 8, first, the normal model rebuilding unit 106 reads a normal model of the other device stored in the normal model storage unit 103 (step ST801). Then, the model holding unit 1061 holds the normal model of the other device as a normal model of a target device.

The normal model rebuilding unit 106 obtains normal feature value data of the target device as training data (step ST802).

Then, the parameter updating unit 1062 updates a parameter of the normal model of the target device held in the model holding unit 1061, using the training data (step ST803).

For example, when it is assumed that the normal model held in the model holding unit 1061 is a graph structure representing a correlation between feature values, and a sample mean, a sample covariance matrix, and a graph structure which are obtained by a parameter update are represented by µ (hat), Σ (hat), and Λ (hat), respectively.

Here, µ (hat) (k) which is a sample mean at the current time is calculated as shown in the following equation (3). In equation (3), $\mu_i$ represents an i element of u.

$$\hat{\mu}(k) = \frac{1}{k}[k\mu_i(k-1) + x(k)] \quad (3)$$

Σ (hat) (k) which is a sample covariance matrix at the current time is calculated as shown in the following equation (4). In equation (4), $\sigma_{ij}^2$ represents an (i, j) element of Σ (hat).

$$\hat{\sigma}_{ij}^2(k) = \frac{1}{k}\left[k\sigma_{ij}^2(k-1) + (x_i(k)-\mu_i(k-1))(x_j(k)-\mu_j(k))\right] 1 \leq i, j \leq r \quad (4)$$

Λ (hat) (k) which is a graph structure at the current time is calculated from µ (hat) (k) which is a sample mean at the current time, Σ (hat) (k) which is a sample covariance matrix at the current time, and Λ (hat) (k−1) which is a graph structure obtained last time. For the initial values of µ (hat), Σ (hat), and Λ (hat), the value of P which is a normal model of the other device is used.

As for Λ (hat) (k), when a covariance matrix is used as a graph structure, Λ (hat) (k)=Σ (hat) (k), and when a precision matrix is used as a graph structure, Λ (hat) (k)=Σ(hat)$^{-1}$(k).

Then, when a sparse graph is used as a graph structure, in LI optimization (the following expression (5)), an optimization problem is solved with Σ (hat)=Σ (hat) (k) and the initial value of A being Λ (hat) (k−1), by which Λ (hat) (k) can be obtained. In expression (5), ρ represents a regularization parameter.

$$\max_{\Lambda}\left[\ln(\det\Lambda) - tr\left(\hat{\sum}\Lambda\right) - \rho\|\Lambda\|_1\right] \quad (5)$$

Then, the normal model rebuilding unit 106 outputs data representing the normal model of the target device (step ST804).

Then, the convergence determining unit 1063 determines whether the parameter updated by the parameter updating unit 1062 has converged (step ST805).

If the convergence determining unit 1063 determines at this step ST805 that the parameter has not converged, then the sequence returns to step ST802 and the above-described operation are repeated. On the other hand, if the convergence determining unit 1063 determines at step ST805 that the parameter has converged, then the sequence ends.

An update of the normal model by the normal model rebuilding unit 106 ends when the parameter of the normal model has converged and there is almost no fluctuation in value. For a method of determining whether the parameter of the normal model has converged, for example, when the normal model is represented by Λ (hat) (k) which is an r×r square matrix, it can be determined that the parameter has converged when Λ (hat) (k) satisfies the following expression (6). In expression (6), ζ is a sufficiently small constant value and tr(•) represents the sum (trace) of diagonal elements of the matrix.

$$|tr(\hat{\Lambda}(k))-tr(\hat{\Lambda}(k-1))|\leq \Sigma \quad (6)$$

In the normal model rebuilding unit 106, there is a case in which before the convergence determining unit 1063 determines that the parameter has converged, no more normal data of the target device can be obtained. In this case, even when the parameter has not converged, the normal model rebuilding unit 106 outputs data representing a normal model of the target device calculated immediately before no more normal data can be obtained.

Next, exemplary operation of the degradation determination model rebuilding unit 107 will be described with reference to FIG. 9.

Figure 9:
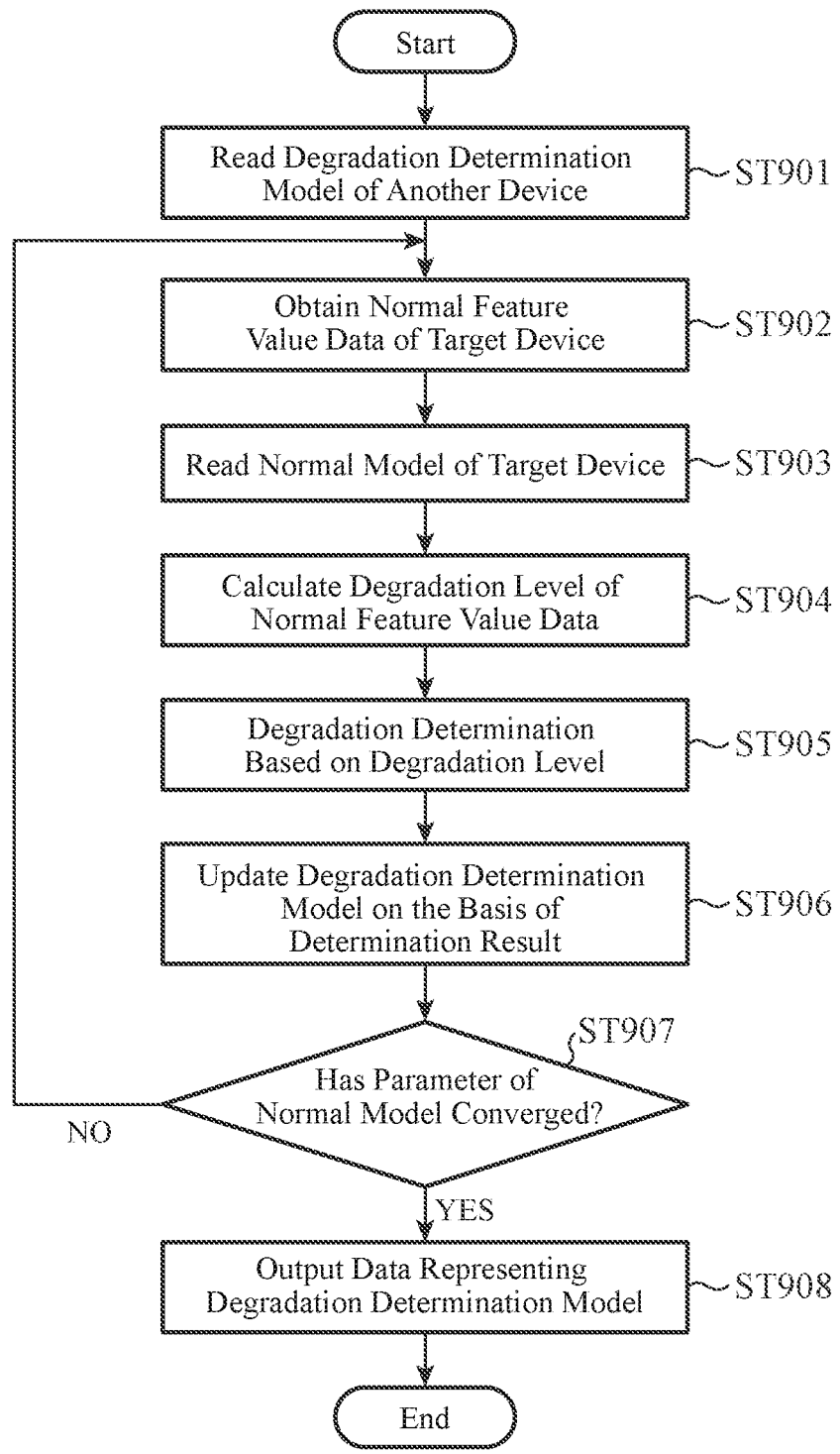
FIG. 9 is a flowchart showing exemplary operation of the degradation determination model rebuilding unit in the first embodiment of the invention.

In the exemplary operation of the degradation determination model rebuilding unit 107, as shown in FIG. 9, first, the degradation determination model rebuilding unit 107 reads a degradation determination model of the other device stored in the degradation determination model storage unit 105 (step ST901). Then, the model holding unit 1071 holds the degradation determination model of the other device as a degradation determination model of the target device.

The degradation determination model rebuilding unit 107 obtains normal feature value data of the target device as training data (step ST902).

The degradation determination model rebuilding unit 107 reads a normal model of the target device built by the normal model rebuilding unit 106 (step ST903).

Then, the degradation level calculating unit 1072 calculates a degradation level of the training data by applying the normal model of the target device to the training data (step ST904).

In this calculation, the degradation determination model rebuilding unit 107 calculates a(k) which is a degradation level of x(k) which is normal feature value data of the target device inputted at the current time, by applying a normal model of the target device updated using x(k) to x(k).

Then, the degradation determining unit 1073 performs a degradation determination by applying the degradation determination model held in the model holding unit 1071 to the degradation level calculated by the degradation level calculating unit 1072 (step ST905).

Then, the model updating unit 1074 updates the degradation determination model held in the model holding unit 1071, on the basis of a result of the determination performed by the degradation determining unit 1073 (step ST906).

Upon the update, the degradation determination model rebuilding unit 107 updates the degradation determination model by comparing P'(a) which is a probability distribution of the degradation level of normal feature value data of the other device with P(a) which is a probability distribution of the degradation level of normal feature value data of the target device and updating a separating plane of a discriminator on the basis of a difference between the probability distributions of the other device and the target device.

As a method of updating a separating plane, for example, a method can be considered in which between P'(a) and P(a) which are probability distributions, a difference between the probability distributions is quantified using Kullback-Leibler divergence, etc., and the separating plane transition is performed more greatly as the difference increases.

As for the direction along which the separating plane transition is performed, for example, a method is used in which X which is an erroneous detection rate of a degradation determination is calculated for the other device beforehand, and Y which is an erroneous detection rate of a degradation determination is calculated by performing a degradation determination on training data which is sequentially collected, using a current degradation determination model, and then a transition is performed in a direction in which Y decreases when X<Y, and in a direction in which Y increases when X>Y.

Then, the degradation determination model rebuilding unit 107 determines whether a parameter of the normal model of the target device has converged (step ST907).

If the degradation determination model rebuilding unit 107 determines at this step ST907 that the parameter of the normal model of the target device has not converged, then the sequence returns to step ST902 and repeats the above-described operation.

On the other hand, if the degradation determination model rebuilding unit 107 determines at this step ST907 that the parameter of the normal model of the target device has converged, then the degradation determination model rebuilding unit 107 outputs data representing the degradation determination model of the target device (step ST908).

Next, exemplary operation of the degradation determining unit 109 will be described with reference to FIG. 10.

Figure 10:
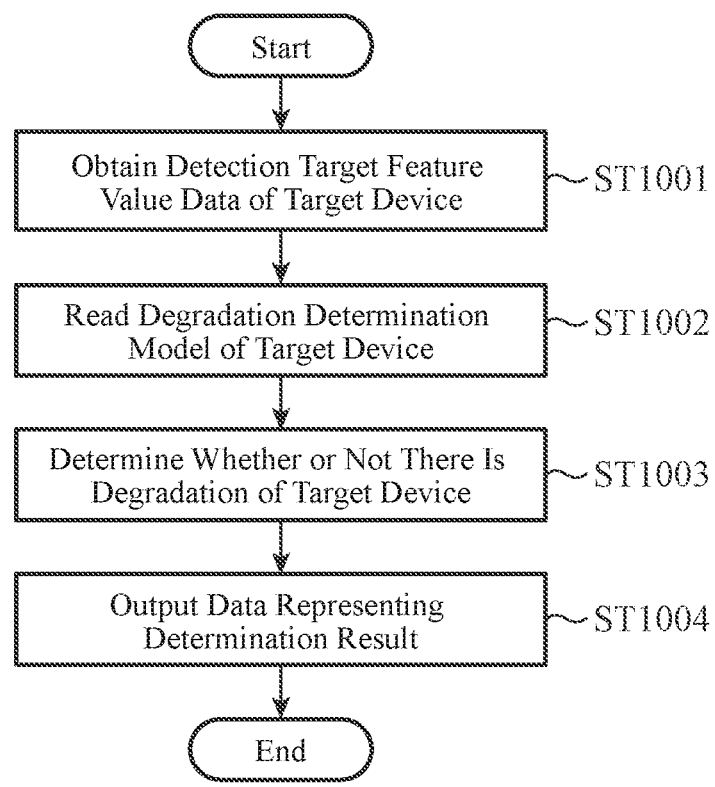
FIG. 10 is a flowchart showing exemplary operation of a degradation determining unit in the first embodiment of the invention.

In the exemplary operation of the degradation determining unit 109, as shown in FIG. 10, first, the degradation determining unit 109 obtains detection target feature value data of the target device extracted by the degradation feature extracting unit 101 (step ST1001).

Then, the degradation determining unit 109 reads a degradation determination model of the target device stored in the degradation determination model storage unit 108 (step ST1002).

Then, the degradation determining unit 109 determines whether or not there is degradation of the target device, by applying the degradation determination model of the target device to the detection target feature value data (step ST1003).

Then, the degradation determining unit 109 outputs data representing a result of the determination (step ST1004).

As described above, according to the first embodiment, the degradation detection system 1 includes the normal model building unit 102 that builds a normal model of the other device on the basis of normal data of the other device; the degradation determination model building unit 104 that builds a degradation determination model of the other device on the basis of the normal data and degradation data of the other device; the normal model rebuilding unit 106 that builds a normal model of a target device on the basis of the normal model built by the normal model building unit 102 and normal data of the target device; the degradation determination model rebuilding unit 107 that builds a degradation determination model of the target device on the basis of the degradation determination model built by the degradation determination model building unit 104 and the normal model built by the normal model rebuilding unit 106; and the degradation determining unit 109 that determines degradation of the target device on the basis of operation data of the target device and the degradation determination model built by the degradation determination model rebuilding unit 107. By this configuration, the degradation detection system 1 according to the first embodiment can detect degradation of the target device without using degradation data of the target device.

Second Embodiment

In the degradation detection system 1 according to the first embodiment, it is assumed that, immediately after installation and operation starting of the target device, there is no degradation of a target device and operation data collected from the target device is normal. However, there is a case in which even immediately after installation and operation starting of the target device, operation data collected from the device is not normal due to initial failure, etc.

Hence, in the degradation detection system 1, the following function may be added: accuracy of a degradation determination is calculated from a degradation determination model of a target device which is sequentially updated, an alarm is outputted when the accuracy is out of an allowable range, and the degradation determination model is modified on the basis of a result of a checkup performed by a checker or an inspector. The degradation detection system 1 having the above-described function will be described below.

Figure 11:
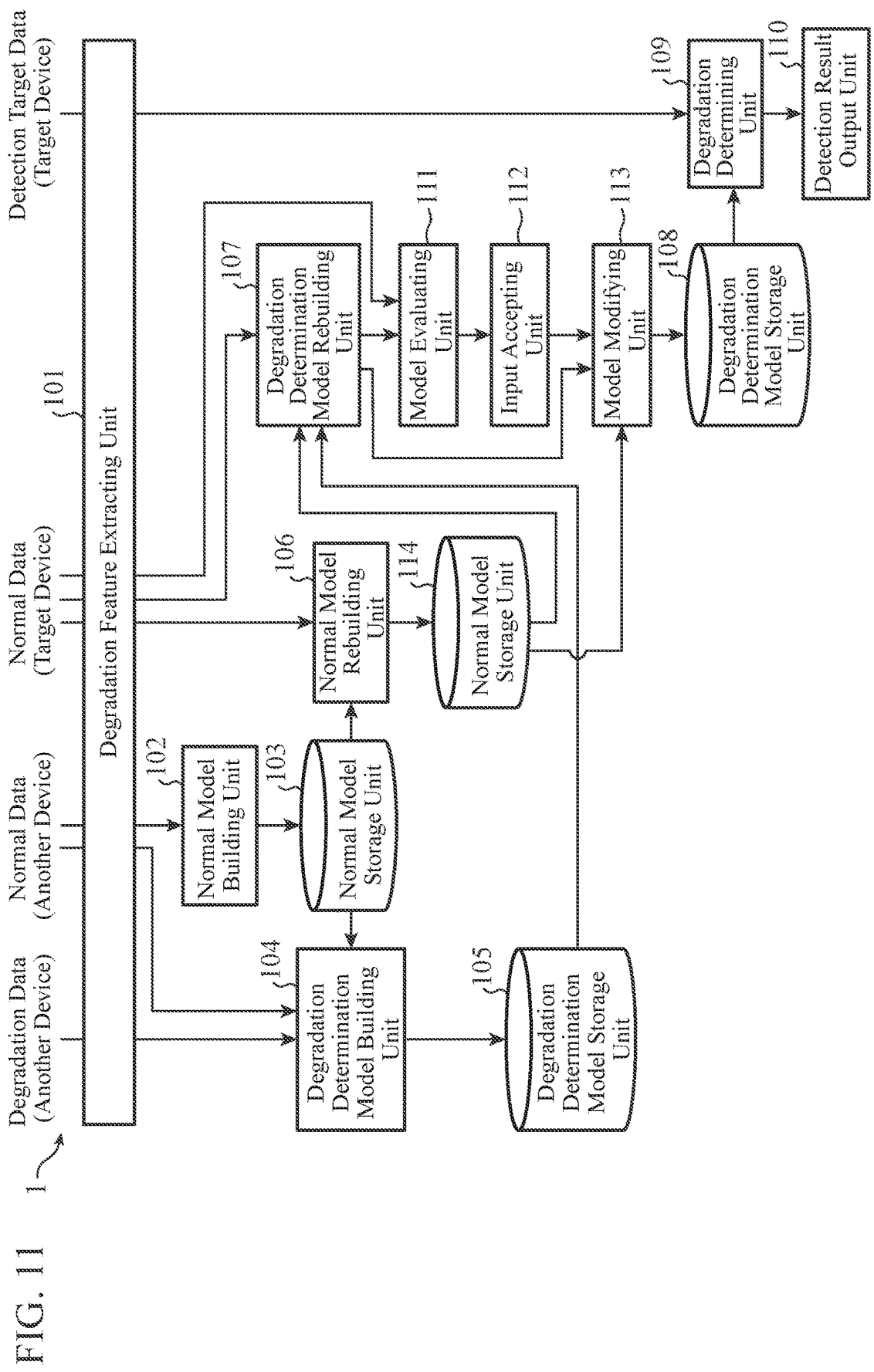
FIG. 11 is a diagram showing an exemplary configuration of a degradation detection system according to a second embodiment of the invention.

FIG. 11 is a diagram showing an exemplary configuration of a degradation detection system 1 according to a second embodiment of the invention. The degradation detection system 1 according to the second embodiment shown in FIG. 11 is obtained by adding a model evaluating unit 111, an input accepting unit 112, a model modifying unit 113, and a normal model storage unit 114 to the degradation detection system 1 according to the first embodiment shown in FIG. 1. Other components are the same as those in the first embodiment, and the same reference signs are used, and only different components will be described.

The model evaluating unit 111 outputs an alarm when accuracy of a degradation determination is out of an allowable range on the basis of normal feature value data of a target device extracted by the degradation feature extracting unit 101 and a degradation determination model built by the degradation determination model rebuilding unit 107. An exemplary configuration of the model evaluating unit 111 will be described later.

The input accepting unit 112 accepts, after an alarm is outputted by the model evaluating unit 111, input indicating a judgement as to whether or not the alarm is correct.

The model modifying unit 113 modifies the degradation determination model built by the degradation determination model rebuilding unit 107, on the basis of the input accepted by the input accepting unit 112. Upon the modification, for example, the model modifying unit 113 may modify the degradation determination model built by the degradation determination model rebuilding unit 107, on the basis of a normal model read from the normal model storage unit 114.

The degradation determination model storage unit 108 stores data representing the degradation determination model modified by the model modifying unit 113.

The normal model storage unit 114 stores data representing a normal model of the target device built by the normal model rebuilding unit 106. The normal model storage unit 114 is not a component essential to the degradation detection system 1 and may not be used.

Next, an exemplary configuration of the model evaluating unit 111 will be described with reference to FIG. 12.

Figure 12:
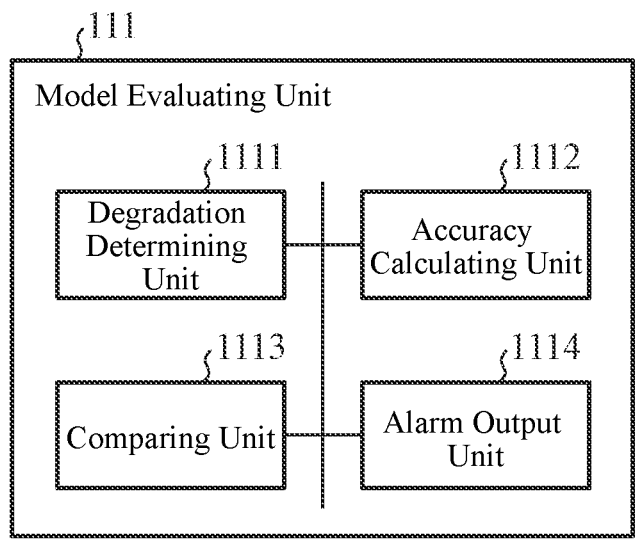
FIG. 12 is a diagram showing an exemplary configuration of a model evaluating unit in the second embodiment of the invention.

As shown in FIG. 12, the model evaluating unit 111 includes a degradation determining unit 1111, an accuracy calculating unit 1112, a comparing unit 1113, and an alarm output unit 1114.

The degradation determining unit 1111 performs a degradation determination by applying a degradation determination model of a target device to normal feature value data of the target device.

The accuracy calculating unit 1112 calculates accuracy of the degradation determination on the basis of a result of the degradation determination performed by the degradation determining unit 1111.

The comparing unit 1113 determines whether the accuracy of the degradation determination calculated by the accuracy calculating unit 1112 is within an allowable range. The allowable range is set, for example, on the basis of the value of accuracy of a degradation determination obtained when a degradation determination model of the other device is applied beforehand to normal feature value data of the other device.

The alarm output unit 1114 outputs an alarm to the outside when the comparing unit 1113 determines that the accuracy of the degradation determination is out of the allowable range.

Next, exemplary operation of evaluation and modification to a degradation determination model by the degradation detection system 1 according to the second embodiment will be described with reference to FIG. 13.

Figure 13:
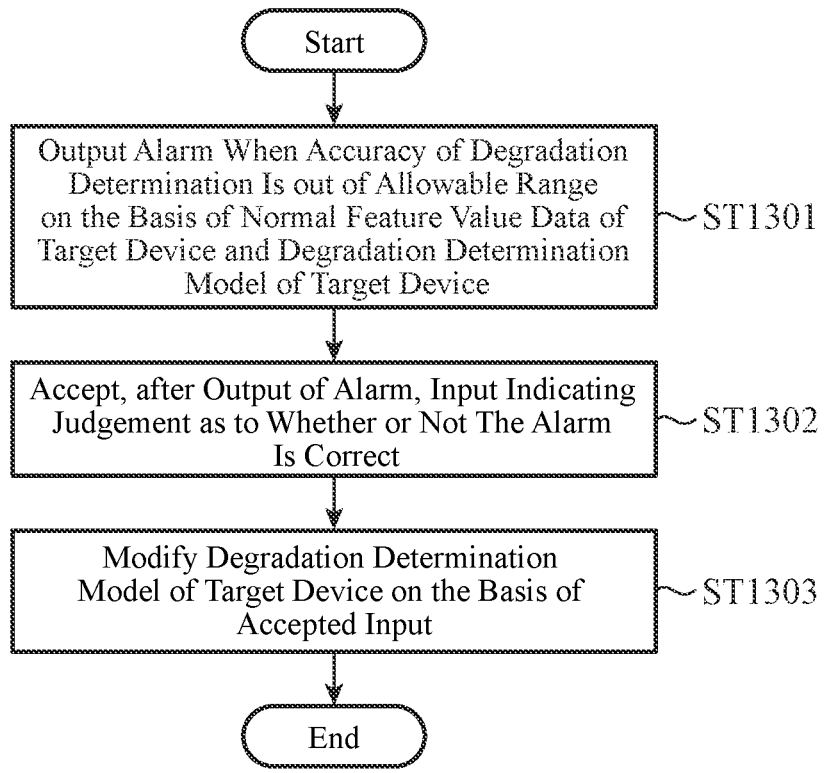
FIG. 13 is a flowchart showing exemplary operation of evaluation and modification to a degradation determination model by the degradation detection system according to the second embodiment of the invention.

In the exemplary operation of evaluation and modification to a degradation determination model by the degradation detection system 1 according to the second embodiment, as shown in FIG. 13, first, the model evaluating unit 111 outputs an alarm when accuracy of a degradation determination is out of an allowable range on the basis of normal feature value data of a target device extracted by the degradation feature extracting unit 101 and a degradation determination model built by the degradation determination model rebuilding unit 107 (step ST1301). Detailed exemplary operation of the model evaluating unit 111 will be described later.

Then, the input accepting unit 112 accepts, after an alarm is outputted by the model evaluating unit 111, input indicating a judgement as to whether or not the alarm is correct (step ST1302). Namely, after the model evaluating unit 111 outputs an alarm, a checker or an inspector checks on the target device and performs input indicating whether or not the alarm is erroneous.

Then, the model modifying unit 113 modifies the degradation determination model built by the degradation determination model rebuilding unit 107, on the basis of the input accepted by the input accepting unit 112 (step ST1303). Detailed exemplary operation of the model modifying unit 113 will be described later.

Next, exemplary operation of the model evaluating unit 111 will be described with reference to FIG. 14.

Figure 14:
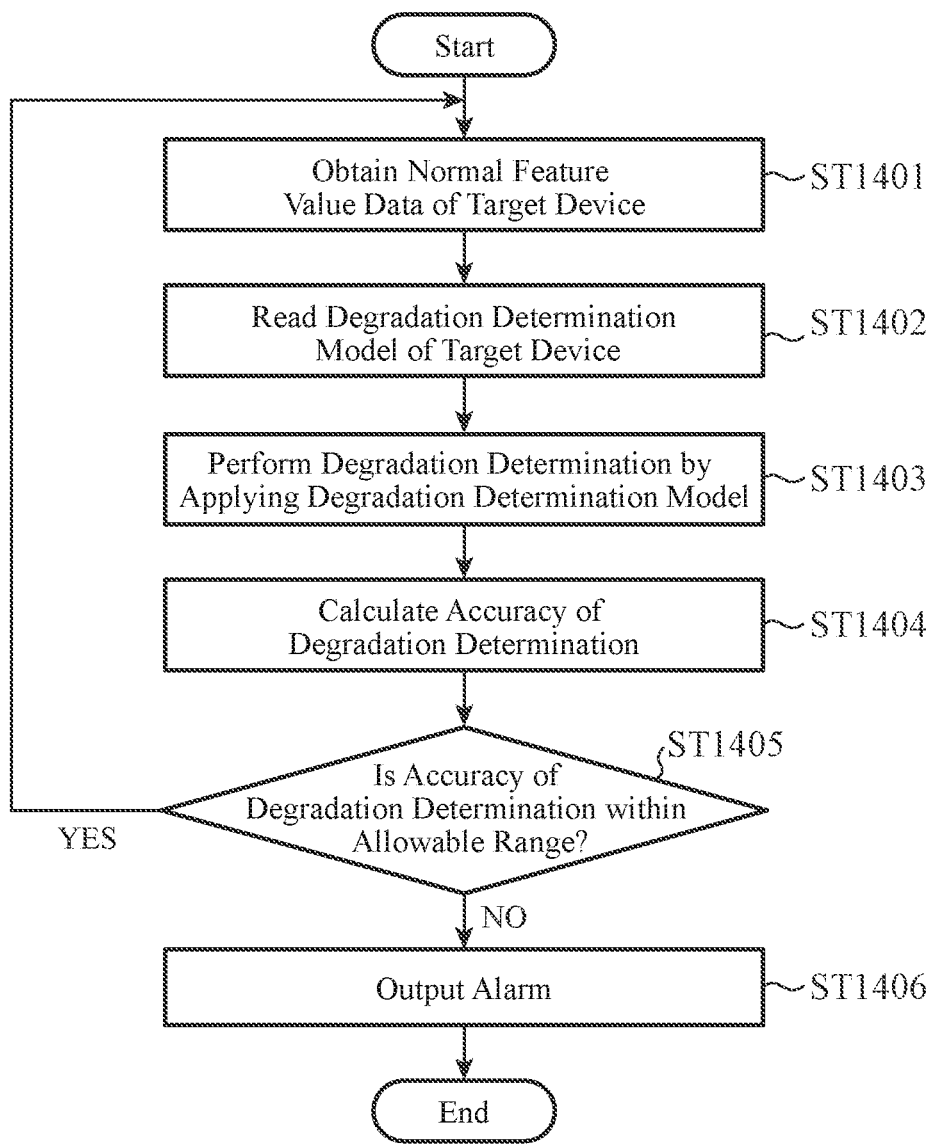
FIG. 14 is a flowchart showing exemplary operation of the model evaluating unit in the second embodiment of the invention.

In the exemplary operation of the model evaluating unit 111, as shown in FIG. 14, first, the model evaluating unit 111 obtains normal feature value data of the target device (step ST1401).

In addition, the model evaluating unit 111 reads a degradation determination model of the target device built by the degradation determination model rebuilding unit 107 (step ST1402).

Then, the degradation determining unit 1111 performs a degradation determination by applying the degradation determination model of the target device to the normal feature value data of the target device (step ST1403).

Then, the accuracy calculating unit 1112 calculates accuracy of the degradation determination performed by the degradation determining unit 1111 on the basis of a result of the degradation determination (step ST1404).

Then, the comparing unit 1113 determines whether the accuracy of the degradation determination calculated by the accuracy calculating unit 1112 is within an allowable range (step ST1405).

If the comparing unit 1113 determines at this step ST1405 that the accuracy of the degradation determination is within the allowable range, the sequence returns to step ST1401 and repeats the above-described operation.

Namely, there is a case in which data of the target device given a normal label is actually abnormal data due to initial failure, etc. In this case, the degradation detection system 1 can build an accurate model by determines whether accuracy of a degradation determination is within the allowable range, and modifies the label when the accuracy is out of the allowable range.

The comparing unit 1113 continues to sequentially perform a determination as to whether or not accuracy of a degradation determination is within the allowable range, while data given a normal label is inputted from the target device. Then, the comparing unit 1113 ends the process at timing at which there is no more input of data given a normal label.

On the other hand, if the comparing unit 1113 determines at step ST1405 that the accuracy of the degradation determination is out of the allowable range, the alarm output unit 1114 outputs an alarm to the outside (step ST1406).

Next, exemplary operation of the model modifying unit 113 will be described with reference to FIG. 15.

Figure 15:
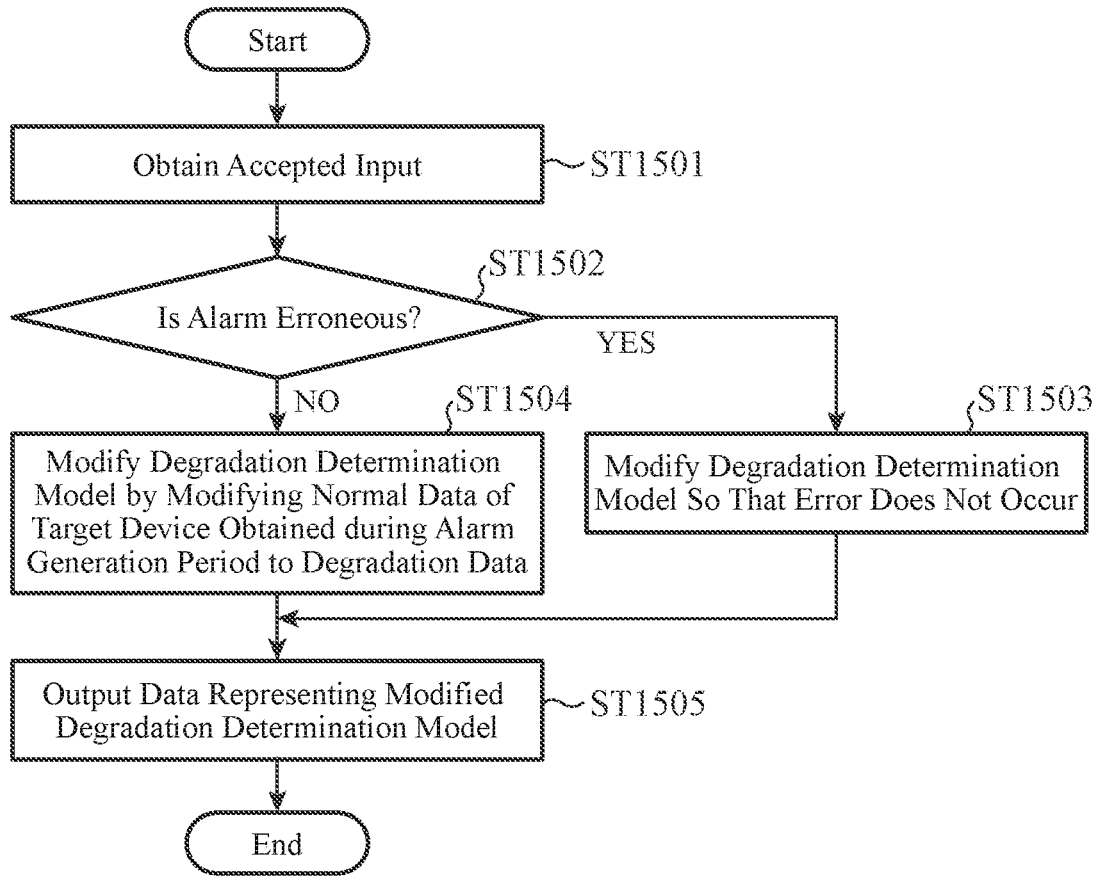
FIG. 15 is a flowchart showing exemplary operation of a model modifying unit in the second embodiment of the invention.

In the exemplary operation of the model modifying unit 113, as shown in FIG. 15, first, the model modifying unit 113 obtains input accepted by the input accepting unit 112 (step ST1501).

Then, the model modifying unit 113 determines whether the input indicates an error in alarm (step ST1502).

If the model modifying unit 113 determines at this step ST1502 that the input indicates an error in alarm, the model modifying unit 113 modifies a degradation determination model so that the error in alarm does not occur (step ST1503). Upon the modification, the model modifying unit 113 may, for example, adjust a separating plane of the degradation determination model so that normal feature value data is properly determined to be normal. Thereafter, the sequence proceeds to step ST1505.

On the other hand, if the model modifying unit 113 determines at step ST1502 that the input does not indicate an error in alarm, the model modifying unit 113 modifies the degradation determination model by correcting normal feature value data (training data) of the target device obtained during an alarm generation period to degradation feature value data (step ST1504). Upon the modification, the model modifying unit 113 may modify the degradation determination model by, for example, obtaining a normal model obtained immediately before the alarm generation period from the normal model storage unit 114 and using the normal model as a current normal model.

Then, the model modifying unit 113 outputs data representing the modified degradation determination model (step ST1505).

As described above, according to the second embodiment, the degradation detection system 1 includes: a model evaluating unit 111 outputting an alarm when accuracy of a degradation determination is out of an allowable range on a basis of the normal data of the target device and the degradation determination model of the target device built by the degradation determination model rebuilding unit 107; an input accepting unit 112 accepting, after the alarm is outputted by the model evaluating unit 111, input indicating a judgement as to whether or not the alarm is correct; and a model modifying unit 113 modifying the degradation determination model of the target device built by the degradation determination model rebuilding unit 107, on a basis of the input accepted by the input accepting unit 112. The degradation determining unit 109 determines degradation of the target device on a basis of operation data of the target device and the degradation determination model of the target device modified by the model modifying unit 113. By this configuration, the degradation detection system 1 according to the second embodiment can detect degradation of the target device even when normal data of the target device is not normal.

Finally, an exemplary hardware configuration of the degradation detection systems I according to the first and second embodiments will be described with reference to FIG. 16. Although an exemplary hardware configuration of the degradation detection system 1 according to the first embodiment is shown below, an exemplary hardware configuration of the degradation detection system 1 according to the second embodiment is also the same.

Figure 16:
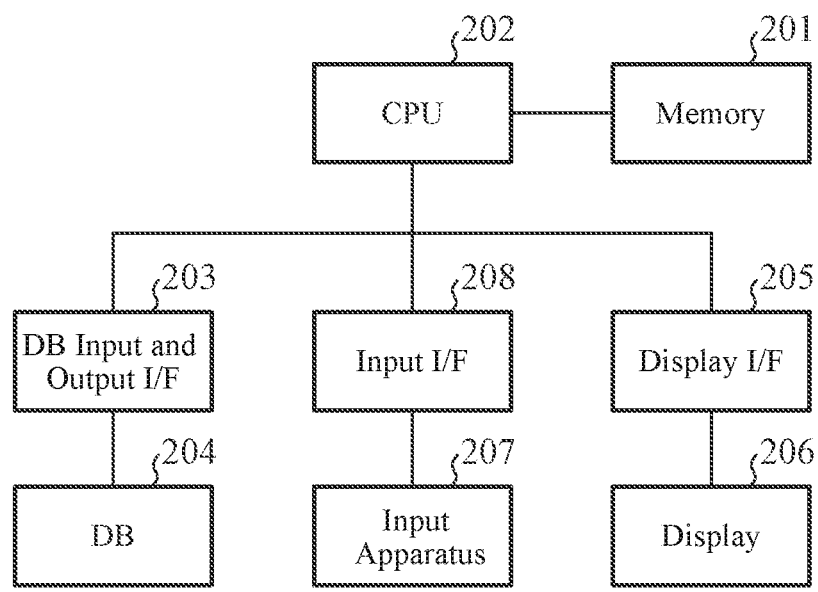
FIG. 16 is a diagram showing an exemplary hardware configuration of the degradation detection systems according to the first and second embodiments of the invention.

As shown in FIG. 16, processes performed by the degradation feature extracting unit 101, the normal model building unit 102, the degradation determination model building unit 104, the normal model rebuilding unit 106, the degradation determination model rebuilding unit 107, and the degradation determining unit 109 are performed by a CPU (central processing unit, which is also referred to as a central processor, a processing unit, an arithmetic unit, a microprocessor, a microcomputer, a processor, or a digital signal processor (DSP)) 202 reading programs stored in a memory 201.

Functions of the degradation feature extracting unit 101, the normal model building unit 102, the degradation determination model building unit 104, the normal model rebuilding unit 106, the degradation determination model rebuilding unit 107, and the degradation determining unit 109 are implemented by software, firmware, or a combination of software and firmware. The software and firmware are described as programs and stored in the memory 201. The CPU 202 implements the function of each unit by reading and executing the programs stored in the memory 201. Namely, the degradation detection system 1 includes the memory 201 for storing programs by which, for example, each step shown in FIGS. 5 to 10 is consequently performed when the programs are executed by the CPU 202. In addition, it can also be said that the programs cause a computer to perform procedures and methods of the degradation feature extracting unit 101, the normal model building unit 102, the degradation determination model building unit 104, the normal model rebuilding unit 106, the degradation determination model rebuilding unit 107, and the degradation determining unit 109.

A parameter of a normal model stored in the normal model storage unit 103, a parameter of a degradation determination model stored in the degradation determination model storage unit 105, and a parameter of a degradation determination model stored in the degradation determination model storage unit 108 each are stored in a DB 204 through a DB input and output I/F 203.

Data representing a result of a determination outputted from the detection result output unit 110 may be stored in the DB 204 or may be displayed on a display 206 through a display I/F 205.

An input apparatus 207 is used to input normal data and degradation data that are collected from the other device and normal data and detection target data that are collected from a target device. A variety of operation data inputted to the input apparatus 207 is stored in the DB 204 or the memory 201 through an input I/F 208.

The memory 201 and the DB 204 correspond, for example, to a nonvolatile or volatile semiconductor memory such as a random access memory (RAM), a read only memory (ROM), a flash memory, an erasable programmable ROM (EPROM), or an Electrically EPROM (EEPROM), a magnetic disk, a flexible disk, an optical disc, a compact disc, a MiniDisc, or a digital versatile disc (DVD).

Note that in the invention of this application, a free combination of the embodiments, modifications to any component of each of the embodiments, or omissions of any component in each of the embodiments are possible within the scope of the invention.

INDUSTRIAL APPLICABILITY

A degradation detection system according to the invention includes a normal model building unit, a degradation determination model building unit, a normal model rebuilding unit, a degradation determination model rebuilding unit, and a degradation determining unit, and can detect degradation of a target device without using operation data in a degradation state of the target device, and thus is suitable as a degradation detection system that detects aging degradation of a device.

REFERENCE SIGNS LIST

1: degradation detection system, 101: degradation feature extracting unit, 102: normal model building unit, 103: normal model storage unit, 104: degradation determination model building unit, 105: degradation determination model storage unit, 106: normal model rebuilding unit, 107: degradation determination model rebuilding unit, 108: degradation determination model storage unit, 109: degradation determining unit, 110: detection result output unit, 111: model evaluating unit, 112: input accepting unit, 113: model modifying unit, 114: normal model storage unit, 201: memory, 202: CPU, 203: DB input and output I/F, 204: DB, 205: display I/F, 206: display, 207: input apparatus, 208: input I/F, 1041: degradation level calculating unit, 1042: discriminator building unit, 1061: model holding unit, 1062: parameter updating unit, 1063: convergence determining unit, 1071: model holding unit, 1072: degradation level calculating unit, 1073: degradation determining unit, 1074: model updating unit, 1111: degradation determining unit (second degradation determining unit), 1112: accuracy calculating unit, 1113: comparing unit, 1114: alarm output unit

The invention claimed is:

1. A degradation detection system comprising processing circuitry that executes control, the processing circuitry
to control to build a normal model of a target device from data of a normal model of another device that is different from the target device and normal training data of the target device, which is operation data of the target device in a normal state, the normal model of the target device being a model of the target device in the normal state, the normal model of the another device being built from normal training data of the another device, which is operation data of the another device in the normal state;
to control to build a degradation determination model of the target device for determining degradation of the target device based on the operation data of the target device from data of the normal model of the target device and data of the degradation determination model of the another device for determining degradation of the another device based on the operation data of the another device, the degradation determination model of the another device being built from the normal training data of the another device and degradation training data of the another device, which is the operation data of the another device in a degradation state;
to control to input the operation data of the target device to the degradation determination model of the target device;
to control to determine degradation of the target device from the degradation determination model of the target device to which the operation data is input; and
to control the target device based on the degradation determination model of the target device.

2. The degradation detection system according to claim 1, wherein the processing circuitry is further
to build the normal model of another device, which is the model of the another device in a normal state, from normal data of the another device, which is operation data of the another device in the normal state; and
to build the degradation determination model of the another device from the normal data of the another device and the degradation data of the another device.

3. The degradation detection system according to claim 2, wherein the normal model of the another device is built using a pattern that can be shown in the normal data of the another device, or a correlation between feature values extracted from one or more pieces of normal data.

4. The degradation detection system according to claim 2, wherein the degradation determination model of the another device is built from the normal data of the another device, the degradation data of the another device, and the normal model of the another device.

5. The degradation detection system according to claim 2, wherein the processing circuitry is further
to calculate a degradation level of the normal data of the another device and a degradation level of the degradation data of the another device by applying the normal model of the another device to each of the normal data of the another device and the degradation data of the another device; and
to build a discriminator that can perform discrimination between the degradation level of the normal data and the degradation level of the degradation data, and to use the discriminator as the degradation determination model.

6. The degradation detection system according to claim 1, wherein the processing circuitry is further
to hold, in a model holding unit, the normal model of the another device as the normal model of the target device;
to update a parameter of the normal model of the target device held in the model holding unit, using the normal data of the target device; and
to determine whether the parameter being updated has converged, and
wherein the parameter is updated until the parameter is determined to have converged.

7. The degradation detection system according to claim 1, wherein the degradation determination model of the target device is built from the degradation determination model of the another device, the normal model of the target device, and the normal data of the target device.

8. The degradation detection system according to claim 1, wherein the processing circuitry is further
to hold, in a model holding unit, the degradation determination model of the another device, as the degradation determination model of the target device;
to calculate a degradation level of the normal data of the target device by applying the normal model of the target device to the normal data of the target device;
to perform a degradation determination by applying the degradation determination model held in the model holding unit to the degradation level; and to update the degradation determination model held in the model holding unit, on a basis of a result of the degradation determination, and wherein the degradation level is calculated until building of the normal model of the target device is completed.

9. The degradation detection system according to claim 1, wherein the processing circuitry is further to output an alarm when accuracy of the degradation determination is out of an allowable range;

to accept, after the alarm is outputted, input indicating a judgement as to whether or not the alarm is correct; and to modify the degradation determination model of the target device from the input, wherein degradation of the target device is determined from the operation data of the target device and the degradation determination model of the target device being modified.

10. The degradation detection system according to claim 1, wherein the target device is a platform screen door.

11. The degradation detection system according to claim 9, wherein the target device is a platform screen door.

12. The degradation detection system according to claim 1, wherein the processing circuitry is further to control to update the normal model of another device based on the normal data of the target device;

control to build the normal model of the target device based on the updated normal model of the another device and store the normal model of the target device in a memory;

control to update the degradation determination model of the another device for determining degradation of the another device from the operation data of the another device based on data of the normal model of the target device and the normal data of the target device; and control to build the degradation determination model of the target device for determining degradation of the target device from the operation data of the target device based on the updated degradation determination model of the another device and store the degradation determination model of the target device in the memory.

13. The degradation detection system according to claim 12, wherein the processing circuitry is further to control to calculate a degradation level of the target device from the normal data of the target device based on the normal model of the target device and the degradation determination model of the another device for determining degradation of the another device from the operation data of the another device; and control to update the degradation determination model of the another device so as to bring a probability distribution of the degradation level of the target device closer to a predetermined probability distribution.

14. The degradation detection system according to claim 1, wherein the processing circuitry is further to control to perform maintenance on the target device based on the degradation determination model of the target device.

15. The degradation detection system according to claim 1, wherein the processing circuitry is further to control to output information related to a degradation level of the target device to a display based on the degradation determination model of the target device.

16. A degradation detection method, the method comprising controlling to build a normal model of a target device from data of a normal model of another device that is different from the target device and normal training data of the target device, which is operation data of the target device in a normal state, the normal model of the target device being a model of the target device in the normal state, the normal model of the another device being built from normal training data of the another device, which is operation data of the another device in the normal state;

controlling to build a degradation determination model of the target device for determining degradation of the target device based on the operation data of the target device from data of the normal model of the target device and data of the degradation determination model of the another device for determining degradation of the another device based on the operation data of the another device, the degradation determination model of the another device being built from the normal training data of the another device and degradation training data of the another device, which is the operation data of the another device in a degradation state;

controlling to input the operation data of the target device to the degradation determination model of the target device;

controlling to determine degradation of the target device from the degradation determination model of the target device to which the operation data is input; and controlling to control the target device based on the degradation determination model of the target device.

17. A non-transitory computer readable medium storing a program for causing a computer to execute a normal model control process of building a normal model of a target device from data of a normal model of another device that is different from the target device and normal training data of the target device, which is operation data of the target device in a normal state, the normal model of the target device being a model of the target device in the normal state, the normal model of the another device being built from normal training data of the another device, which is operation data of the another device in the normal state;

a degradation determination model control process of building a degradation determination model of the target device for determining degradation of the target device based on the operation data of the target device from data of the normal model of the target device and data of the degradation determination model of the another device for determining degradation of the another device based on the operation data of the another device, the degradation determination model of the another device being built from the normal training data of the another device and degradation training data of the another device, which is the operation data of the another device in a degradation state;

an input control process of inputting the operation data of the target device to the degradation determination model of the target device; and a degradation determination control process of determining degradation of the target device from the degradation determination model of the target device to which the operation data is input and controlling the target device based on the degradation determination model of the target device.

* * * * *